F. DUGAS.
APPARATUS FOR FACING GRINDSTONES.
APPLICATION FILED JULY 14, 1917.
1,308,895.
Patented July 8, 1919.
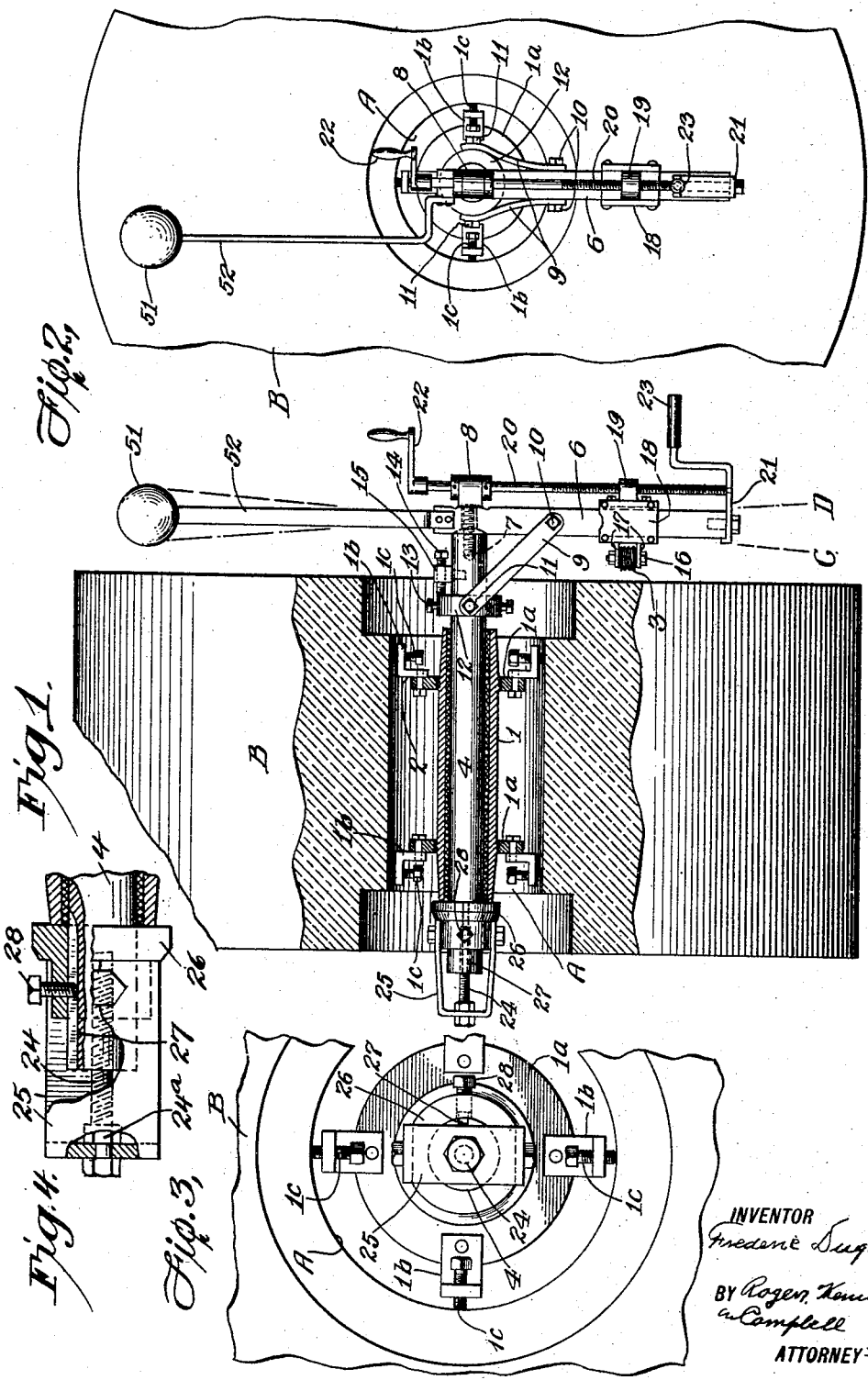
INVENTOR
Frederic Dugas
BY Rogers, Kennedy
& Campbell
ATTORNEYS

UNITED STATES PATENT OFFICE.

FREDERIC DUGAS, OF JAY, MAINE, ASSIGNOR TO INTERNATIONAL PAPER COMPANY, A CORPORATION OF NEW YORK.

APPARATUS FOR FACING GRINDSTONES.

1,308,895.    Specification of Letters Patent.    Patented July 8, 1919.

Application filed July 14, 1917. Serial No. 180,639.

*To all whom it may concern:*

Be it known that I, FREDERIC DUGAS, a citizen of Canada, residing at Jay, in the county of Franklin and State of Maine, have invented certain new and useful Improvements in Apparatus for Facing Grindstones, of which the following is a specification, reference being had therein to the accompanying drawing.

This invention relates to a machine for facing grindstones, such for instance as are employed for grinding wood for the production of pulp in the manufacture of paper. Such stones are usually mounted on a shaft extending through a central opening in the stone, which latter is clamped to the shaft between cheek plates or disks screwed on the shaft.

My improved machine is designed to act on and face the side surfaces of the stone against which the cheek plates bear, in order that these surfaces will be symmetrical with respect to each other and to the central plane of the stone, to the end that the plane of the stone will extend in exact right angular relation to the axis of the shaft, and the clamping pressure of the cheek plates will be exerted in parallelism with said axis.

The machine embodying my invention is portable in character so that it may be temporarily attached to the stone to be faced, and when so attached may be operated to subject first one side of the stone to the facing operation and then the other side, the machine being reversed in its position relative to the stone for the two operations.

In its preferred form the machine comprises as its main features a sustaining frame having means for fastening the same detachably in the opening in the stone in centered relation to said opening, a facing tool to act on the side faces of the stone, and rotatably sustained by the sustaining member, the said facing tool being movable radially of the axis of rotation so that it may be fed toward and from the center of the stone, and by its combined rotating and radial movements will subject all portions of the surface to be acted on, to a facing operation.

In the accompanying drawings:

Figure 1 is a longitudinal sectional elevation of my improved facing machine showing the same applied to a grindstone in operative relation thereto.

Fig. 2 is an end elevation of the same.

Fig. 3 is a similar view of the opposite end of the machine.

Fig. 4 is a section on an enlarged scale, showing particularly the means for adjusting the rotary shaft carrying the facing tool, axially to cause the tool to enter the material of the work.

Referring to the drawings:

My improved machine comprises as its main parts a sustaining frame 1, having fastening means 2 by which it is detachably fastened in place in the opening A in the grindstone B; a facing tool 3, and a rotary member 4 carrying the facing tool and rotatably sustained by the sustaining frame so that the facing tool can be rotated in contact with the side of the stone.

The sustaining frame in the present instance is in the form of a tube provided near its opposite ends with radially projecting lugs $1^a$, in the present instance four at each end, to the ends of which lugs are attached angular brackets $1^b$ whose outer free ends extend axially and adjacent the interior of the opening in the stone, radial clamping bolts $1^c$ being screwed through the brackets and adapted at their outer ends to bind against the wall of the opening in the stone. By this means the sustaining frame may be firmly fastened fixedly but detachably in place in the stone, and may be accurately centered therein by the proper adjustment of the clamping bolts.

The rotary member 4 is in the form of a shaft which is mounted for rotation in an axial bearing opening in the tubular sustaining member, one end of the shaft projecting some distance beyond the end of the sustaining member, and when the latter is in position in the stone, extending beyond the side face of the latter. Fastened to the projecting end of the shaft is a radially extending arm 6 which is formed near its inner end with a spherical or concave seat which receives the convex or spherical end of the shaft, the arm being clamped tightly and in fixed relations to the shaft by means of a clamping bolt 7 extending loosely through an opening in the arm and screwed into the end of the shaft. The bolt is provided with a head 8 bearing against the outer side of the arm, the contacting surfaces of the head and arm being spherically formed to correspond to the engaging surfaces of the arm and shaft.

This method of connecting the arm with the shaft permits the arm to be tilted or tipped with reference to the shaft so that it may be adjusted to different angular positions relative thereto, the purpose of which will presently appear. The arm is maintained in its proper angular position relative to the shaft by means of two links 9 whose outer ends are pivoted as at 10 to the opposite sides of the arm from which point the links extend inwardly toward the shaft and are pivoted at their inner extremities as at 11 to the opposite sides of a collar 12 surrounding the projecting end of the shaft. The collar is fastened adjustably on the shaft by means of set screws 13 extending through the collar and engaging the shaft, and the adjustment of the collar is effected by means of an axially extending adjusting screw 14 screwed in a fixed lug 15 projecting laterally from the shaft and engaging the side of the collar. As a result of the construction described, when it is desired to vary the angular relation of the arm 6 to the shaft, the screws 13, 11 and 10 are first loosened, then the shaft is held from turning, and finally the arm 6 with its attached parts is turned to the left to unscrew bolt 7. This action will separate the head 8 of the bolt from the arm and will release the latter from the shaft. The arm is now shifted to the angle desired which will shift the collar 12 on the shaft, and the screw 14 is turned up against the collar to hold it, whereupon the arm in its angular position is turned to the right to screw up the bolt 7 and cause its head to bind the arm against the end of the shaft and hold it in its new position. Finally the screws 13, 11 and 10 are tightened up, which will fixedly hold the parts in their adjusting positions.

From the foregoing description it will be observed that the arm is sustained by the shaft and in its rotation the shaft is rotated with it about the axis of the latter, the shaft thus forming in effect a journal for the arm, which journal, when the sustaining member is clamped in centered relation to the opening through the stone, will be in coincidence with the axis of said opening.

The facing tool 3 before alluded to is preferably in the form of a bur wheel mounted loosely on a stud 16 extending longitudinally of the arm and sustained by two ears 17 projecting inwardly from a slide 18 mounted on the arm to move longitudinally thereof. At its opposite side the slide is provided with an internally threaded lug 19 in which is screwed a rotary feeding screw 20 extending longitudinally of the arm and rotatably mounted at its outer end in a bracket 21 fixed to the end of the arm. At its end the feeding screw is journaled in the head 8 of the bolt 7, and has fixed to its extremity a crank 22 for turning it.

When the machine is fastened to the stone with the tubular sustaining frame in centered relation to the opening therein and with the shaft properly adjusted by the means presently to be described to cause the bur wheel to engage the side of the stone, the rotation of the arm about the axis of the shaft, which may be effected by means of a handle 23 fixed to the bracket 21, will cause the bur wheel to traverse the side of the stone in a circular path and the stone will be subjected along said path to a facing action, and by feeding the bur wheel radially along the arm from time to time by the operation of the feeding screw, fresh portions of the stone will be acted on, the combined rotary and radial movements of the bur wheel thus causing the same to traverse and act on all portions of the stone within the area to be faced.

The adjustable connection of the arm 6 with the shaft as described, whereby the arm may be tilted or tipped relatively to the shaft, enables the arm to be set at a true right angular relation to the shaft as shown by the full lines in Fig. 1, or the arm may be set in other angular relations thereto, as shown by the dotted lines C and D in said figure. When the arm is set in true right angular relation to the shaft, the bur wheel will operate to dress the sides of the stone in planes parallel with the plane of the stone, and will form parallel faces on the sides of the stone against which the cheek plates will flatly bear. When the arm is set at an inward inclination as shown by the dotted line C the sides of the stone will be dressed at a corresponding inclination and bearing surfaces for the cheek plates of general convex form may be produced; and when the arm is set at the opposite inclination as shown by the dotted line D, the sides of the stone will be dressed at a corresponding angle and bearing surfaces for the cheek plates of general concave form may be produced.

The position of the shaft longitudinally with reference to the axis of the stone to cause the bur wheel to properly engage the side of the stone, and the movement of the shaft longitudinally to cause the wheel to feed into the material of the stone, is controlled and effected in the present instance by means of an axial adjusting screw 24 coöperating with the end of the shaft opposite that to which the arm 6 is attached. This screw is threaded into the end of the shaft and is rotatably sustained at its outer end in a yoke frame 25 fixedly connected at its inner end with a collar 26. The collar seats loosely around the end of the shaft and abuts against the end of the tubular sustaining member, the shaft being formed with a longitudinal key-way or slot 27 in which slidingly engages the end of a screw 28 carried by the collar. As a result of this construction, by turning the screw 24 in the yoke frame in the proper direction, the shaft and yoke frame being held against circumferential relative movement by the screw 28 engaging in the key-way, and the yoke being held against endwise movement by abutting against the end of the sustaining sleeve, the shaft will be shifted endwise in the sustaining sleeve and will draw the arm 6 toward the side of the stone, thereby forcing the bur wheel in engagement with the stone. In this way the wheel may be caused to enter more deeply into the material of the stone so that in the successive rotations of the wheel and the radial feed of the latter, the stone may be effectively and properly faced. The adjusting screw is provided with a lock nut 24ª which bears against the yoke 25 and acts to hold the screw from turning after it has been screwed up to the proper position.

In the use of the machine to dress the sides of the stone, for instance in planes parallel with the central plane of the stone, the machine is set in place as shown in Fig. 1, with the tubular sustaining member clamped in the opening and properly centered, and the arm 6 adjusted at right angles to the shaft 4. The adjusting screw 24 is then turned up to cause the bur wheel to engage the side of the stone, and the arm is rotated by the handle 23. In this action the bur wheel will traverse the side of the stone in a circular path, and by feeding the wheel radially by means of the feed screw, 20, the full area of the stone which is to be acted on will be traversed by the wheel and a dressed surface will be formed extending in a plane in true parallelism with the central plane of the wheel. When the surface of one side of the stone has thus been properly dressed and formed, the mechanism is reversed in position on the stone to cause the bur wheel to act on the opposite side. This is effected by unscrewing the adjusting screw 24 from the end of the shaft and slipping the collar 26, together with the attached yoke frame, from the shaft. The shaft is now withdrawn endwise from the tubular support, carrying with it the attached arm 6 and connected parts, and is reversed in position and inserted in the opposite end of the tubular support. The yoke frame with the attached collar and adjusting screw 24 is applied to the end of the shaft projecting from the tubular support and secured in place in the same relative position on the shaft they formerly occupied, and by rotating the arm as before, the bur wheel will be caused to act on the side of the stone and dress the same in the manner previously described. In the new position of the parts the bur wheel will occupy the same relative position to the side of the stone as it did before, and the second side will be given a dressed surface symmetrical with that first formed and in a plane parallel with the central plane of the stone.

It is seen, therefore, that by this mechanism the opposite sides of the stone surrounding the opening therethrough may be dressed expeditiously and in a uniform manner, and surfaces may be formed thereon which will bear exact symmetrical relations to each other, thereby affording bearing surfaces against which the cheek plates would bear so as to sustain the stone with its plane in true right angular relation to the axis of rotation. By the proper adjustment of the arm carrying the bur wheel and the manipulation of the feed screw and the axial adjusting screw 24, the dressed surfaces may be given not only the flat form parallel with the plane of the stone, but may be formed either convex or concave to accommodate correspondingly formed cheek plates, this latter form of the dressed surfaces being employed in order to prevent the explosion or destruction of the stone by centrifugal force.

The arm 6 is counterbalanced by means of a counterbalancing weight 51 fixed to the end of a rod 52 fixed to the inner end of the arm and extending radially therefrom.

In the foregoing description and accompanying drawings I have set forth my invention in the particular detailed form which I prefer to adopt, and which in practice has been found to answer to a satisfactory degree the ends and objects to be attained. It will be manifest, however, that the details thereof may be variously changed and modified without departing from the limits of my invention; and further it will be understood that the invention is not limited to any particular form or construction of the parts except in so far as such limitations are specified in the claims.

Having thus described my invention, what I claim is:

1. A machine for facing grindstones, comprising in combination, a sustaining frame having means for securing it to the stone, a shaft mounted in said frame and rotatable on an axis extending axially of the stone, an arm movably connected with the shaft and extending radially thereof, a facing tool carried by the arm, a collar adjustable longitudinally on the shaft and connections between the collar and arm.

2. A machine for facing grindstones, comprising in combination, a sustaining frame having means for securing it to the stone, a facing tool sustained by the frame and rotatable about an axis extending axially of the stone, and means for feeding said tool relatively to the sustaining frame toward the stone to cause it to enter more deeply into the material thereof.

3. A machine for facing grindstones, comprising in combination, a sustaining frame having means for securing it to the stone, a shaft mounted in said frame and rotatable about an axis extending axially of the stone, a facing tool sustained by the shaft in position to act on the side of the stone, and means for feeding the shaft endwise to cause the tool to enter the material of the stone.

4. A machine for facing grindstones, comprising in combination, a sustaining frame having means for securing it to the stone, a shaft mounted in the frame and rotatable about an axis extending axially of the stone, a facing tool carried by the shaft and rotatable therewith to act on the side of the stone, a frame surrounding the opposite end of the shaft and abutting against the end of the sustaining frame, and an adjusting screw mounted on said frame and screwed into the shaft.

5. A machine for facing grindstones, comprising in combination, a tubular sustaining frame having means for securing it in an axial opening in the stone, a shaft rotatably mounted in said sustaining frame to rotate about an axis extending axially of the stone, and a facing tool carried by said shaft and rotatable therewith in position to act on one side of the stone, said shaft being removable endwise from one end of the frame and insertible in the other end to cause the facing tool to act on the opposite side of the stone.

6. A portable attachment for facing grindstones, comprising in combination, a sustaining frame in the form of a tube, having means for fastening it fixedly in an axial opening in the stone in centered relation to the axis thereof, a shaft rotatably mounted in said tube, means applied to the shaft and engaging the tube for holding the shaft in operative relation to the tube, said means being removable to permit the shaft to be withdrawn from one end of the tube and inserted into its other end, an arm carried by the shaft, and a facing tool sustained by the arm in position to act on the face of the stone in the rotation of the shaft.

In testimony whereof, I have affixed my signature hereto.

FREDERIC DUGAS.

Copies of this patent may be obtained for five cents each, by addressing the "Commissioner of Patents, Washington, D. C."